(12) United States Patent
Kakiuchi

(10) Patent No.: US 12,464,228 B2
(45) Date of Patent: Nov. 4, 2025

(54) INFORMATION PROCESSING APPARATUS, CONTROL APPARATUS, AND CONTROL METHOD

(71) Applicant: CANON KABUSHIKI KAISHA, Tokyo (JP)

(72) Inventor: Kotomi Kakiuchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 279 days.

(21) Appl. No.: 18/492,851

(22) Filed: Oct. 24, 2023

(65) Prior Publication Data

US 2024/0155226 A1    May 9, 2024

(30) Foreign Application Priority Data

Nov. 8, 2022  (JP) ................................ 2022-179089

(51) Int. Cl.
*H04N 23/60* (2023.01)
*H04N 23/611* (2023.01)
*H04N 23/617* (2023.01)
*H04N 23/695* (2023.01)

(52) U.S. Cl.
CPC .......... *H04N 23/64* (2023.01); *H04N 23/611* (2023.01); *H04N 23/617* (2023.01); *H04N 23/695* (2023.01)

(58) Field of Classification Search
CPC .... H04N 23/611; H04N 23/64; H04N 23/617; H04N 23/695
USPC ...................................................... 348/207.1
See application file for complete search history.

(56) References Cited

U.S. PATENT DOCUMENTS

| | | | | |
|---|---|---|---|---|
| 10,915,611 B2* | 2/2021 | Roh | ....................... | G06F 21/31 |
| 12,177,573 B2* | 12/2024 | Kamba | ................... | H04N 23/62 |
| 12,243,523 B2* | 3/2025 | Simes | ..................... | G06Q 10/10 |
| 2008/0034362 A1* | 2/2008 | Hayama | .................. | G06F 9/541 |
| | | | | 717/174 |
| 2012/0183270 A1* | 7/2012 | Greenblatt | .............. | G06F 21/34 |
| | | | | 386/E5.069 |
| 2020/0089846 A1* | 3/2020 | Roh | .................... | G05B 19/4155 |
| 2021/0007571 A1* | 1/2021 | Ike | ........................ | A47L 9/2852 |
| 2023/0019044 A1* | 1/2023 | Bora | ....................... | H04W 4/80 |
| 2023/0069440 A1* | 3/2023 | Kamba | ................ | H04N 23/661 |
| 2023/0098174 A1* | 3/2023 | Simes | ................... | G06F 40/216 |
| | | | | 704/275 |

FOREIGN PATENT DOCUMENTS

JP          6664641 B1    3/2020

\* cited by examiner

*Primary Examiner* — Pritham D Prabhakher
(74) *Attorney, Agent, or Firm* — Venable LLP

(57) ABSTRACT

An information processing apparatus which generates a program to be executed by a control apparatus, The information processing apparatus comprises a transmission unit that transmits the program and an execution method of the program to the control apparatus, and a control unit that in a case where the execution method of the program is a first execution method, does not transmit a request for obtaining an execution status of the program to the control apparatus, and in a case where the execution method of the program is a second execution method different from the first execution method, transmits a request for obtaining an execution status of the program to the control apparatus and displays an execution status of the program received from the control apparatus.

19 Claims, 18 Drawing Sheets

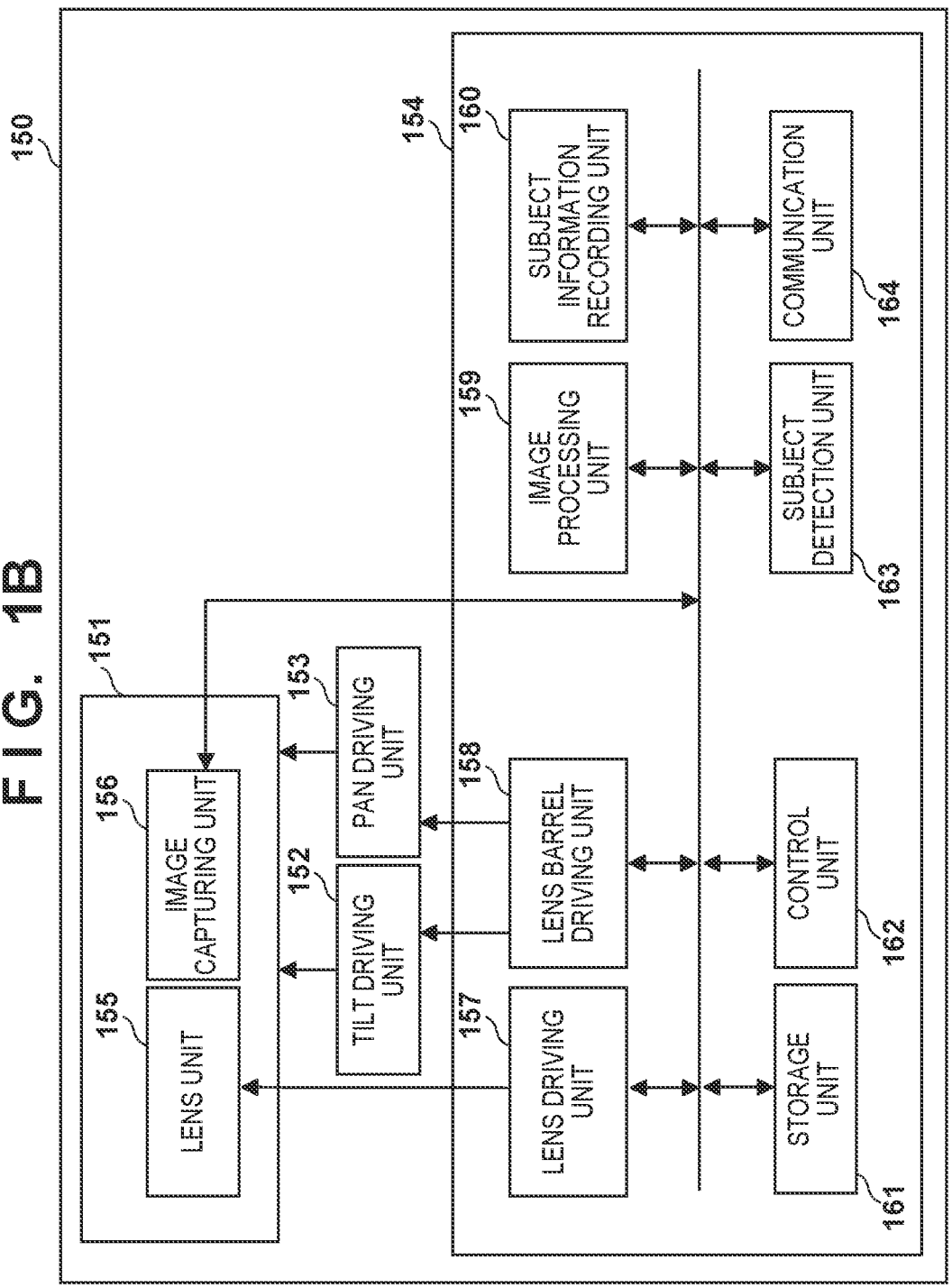

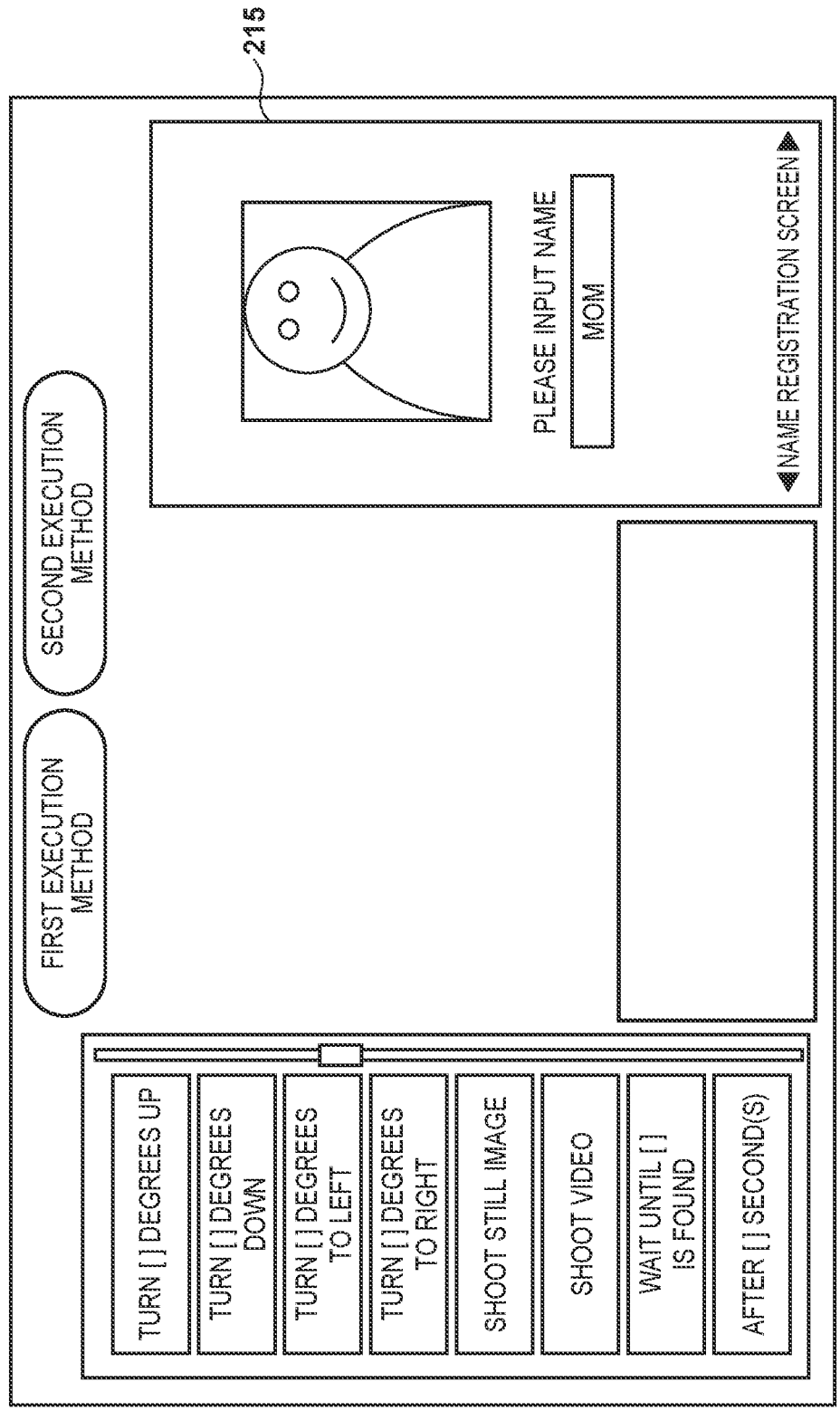

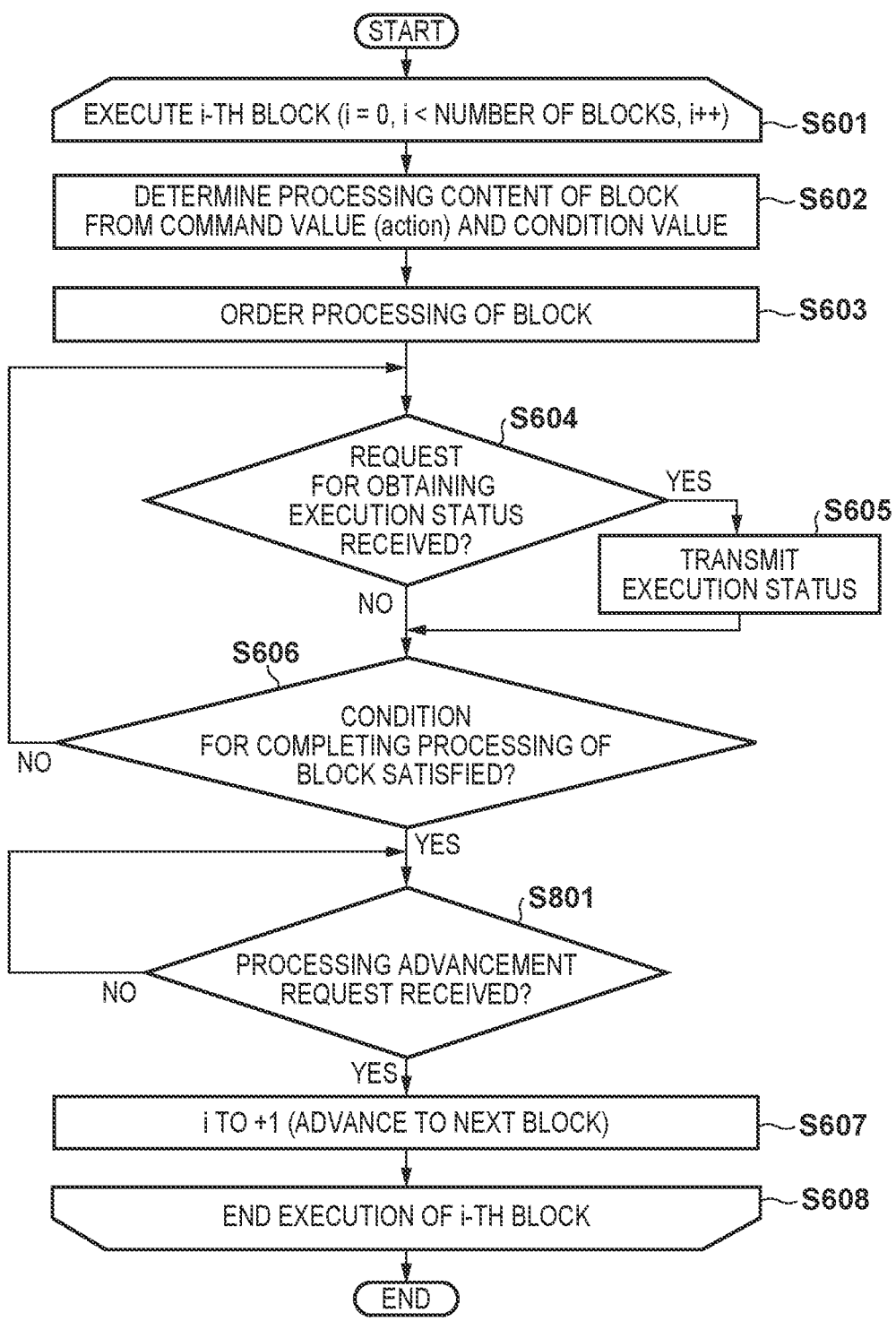

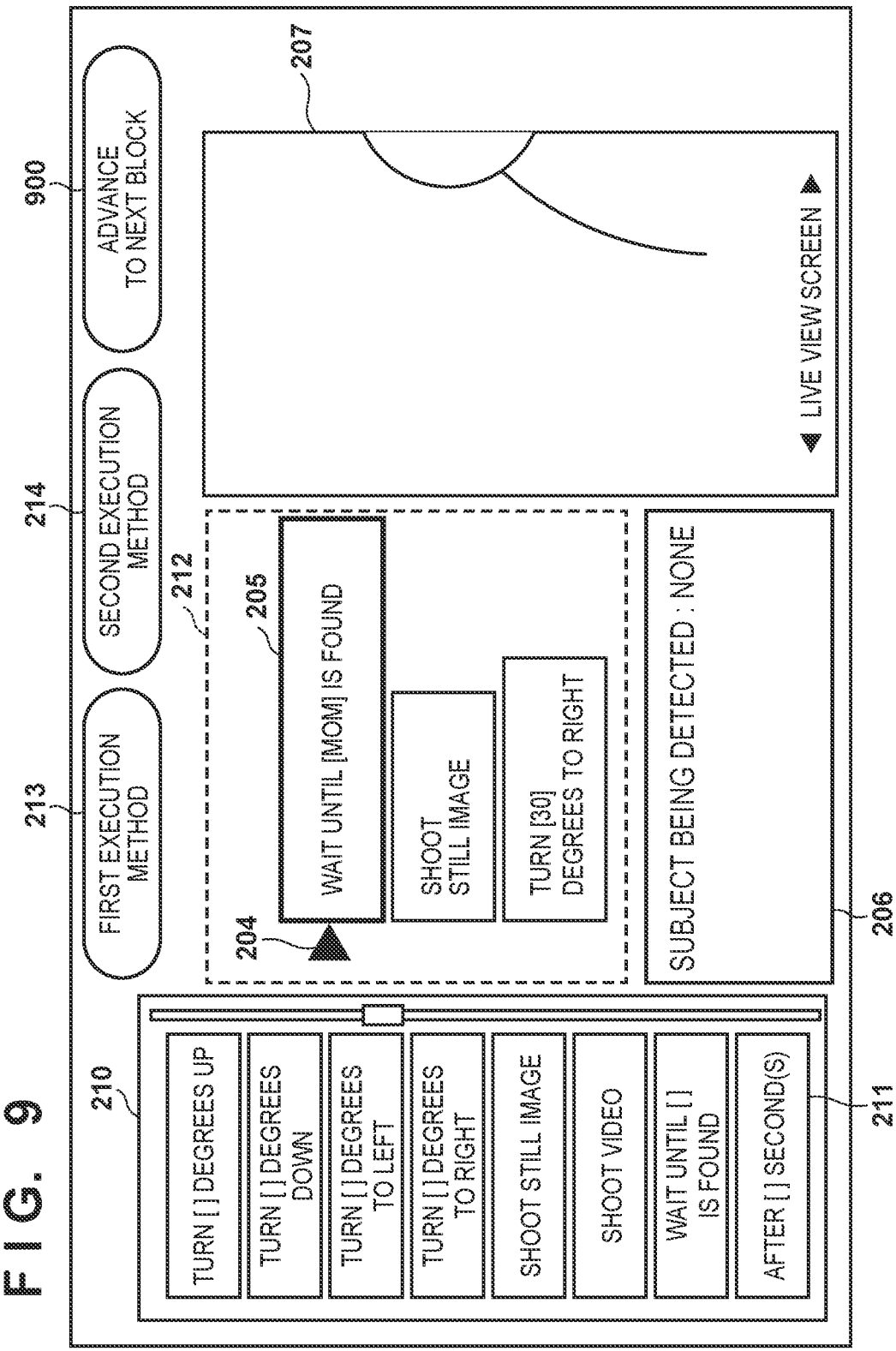

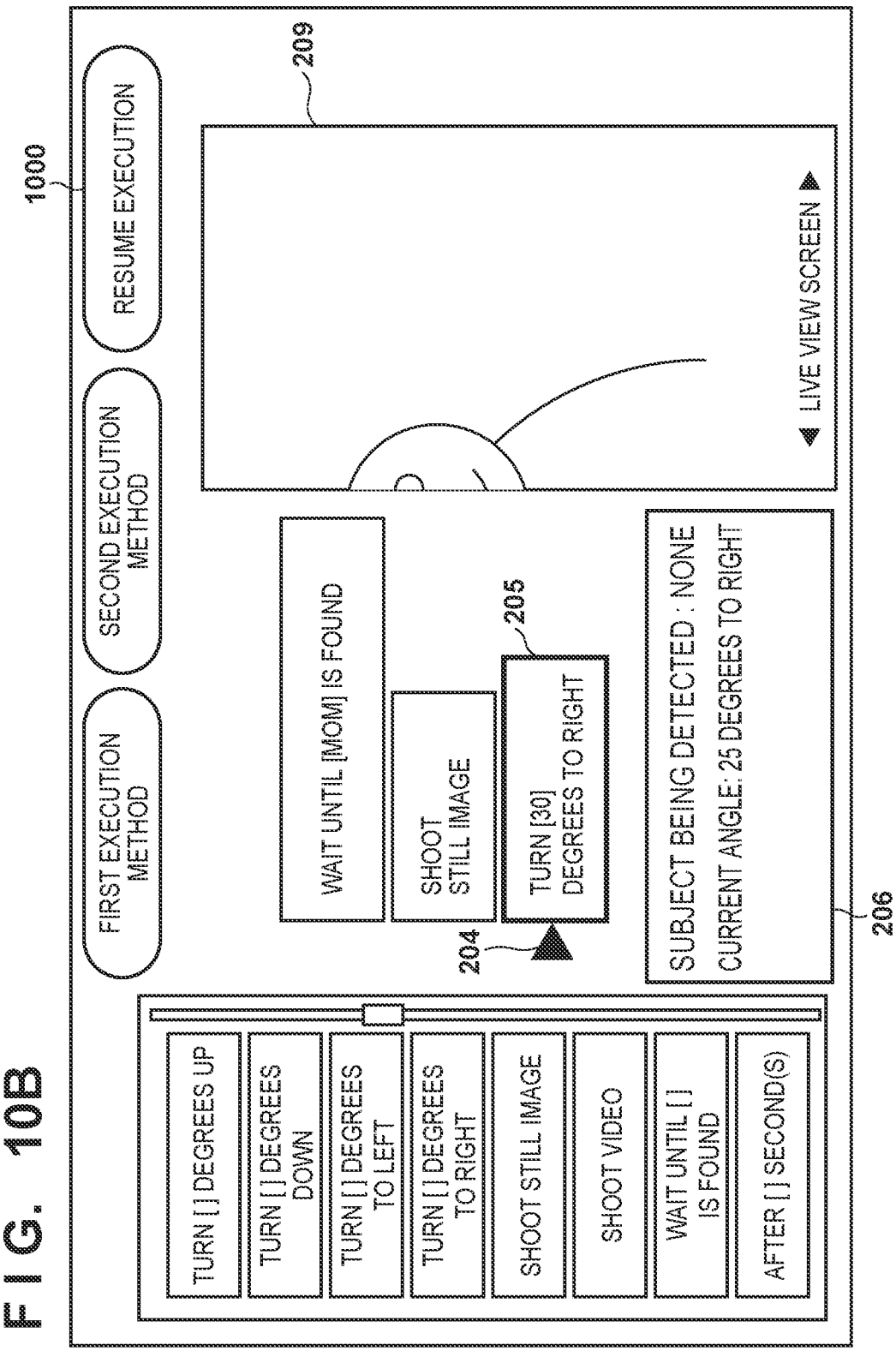

INFORMATION PROCESSING APPARATUS, CONTROL APPARATUS, AND CONTROL METHOD

BACKGROUND OF THE INVENTION

Field of the Invention

The present invention relates to techniques for supporting development of a program.

Description of the Related Art

A common method of programming is a method of coding in which text is typed, and this is called "coding" or "text-based programming". Another method of programming is "visual programming". "Visual programming" is a method of generating a program using visual objects rather than text.

There are various kinds of "visual programming"; for example, there are a method in which objects called blocks are combined on the screen and a method in which rectangular and circular objects are connected on a screen using arrows and lines. Systems for controlling a physical control target, such as a robot, using "visual programming" is also known.

Japanese Patent No. 6664641 discloses a technique for enabling a control target to perform a desired operation by a user performing programming.

However, Japanese Patent No. 6664641 does not mention displaying a program execution status for confirming (debugging) whether the current program does what it is expected to do while the user is generating the program. In other words, although it is necessary to externally visually confirm the operation of a control target to confirm whether the program is as expected, in Japanese Patent No. 6664641, since the program execution status of a control target cannot be visually confirmed, it is difficult to determine whether the program does what is expected.

SUMMARY OF THE INVENTION

The present invention has been made in consideration of the aforementioned problems, and realizes techniques for supporting program generation of a user by visualizing a status of program execution in a control target.

In order to solve the aforementioned problems, the present invention provides an information processing apparatus which generates a program to be executed by a control apparatus, the information processing apparatus comprising: a transmission unit that transmits the program and an execution method of the program to the control apparatus; and a control unit that in a case where the execution method of the program is a first execution method, does not transmit a request for obtaining an execution status of the program to the control apparatus, and in a case where the execution method of the program is a second execution method different from the first execution method, transmits a request for obtaining an execution status of the program to the control apparatus and displays an execution status of the program received from the control apparatus.

In order to solve the aforementioned problems, the present invention provides a control apparatus which is capable of communicating with an information processing apparatus, the control apparatus comprising: a reception unit that receives a program and an execution method of the program from the information processing apparatus; and a control unit that executes the program based on the execution method, wherein upon receiving a request for obtaining an execution status of the program from the information processing apparatus, the control unit transmits the execution status of the program to the information processing apparatus.

In order to solve the aforementioned problems, the present invention provides a method of controlling an information processing apparatus which generates a program to be executed by a control apparatus, the method comprising: transmitting the program and an execution method of the program to the control apparatus; and performing control in a case where the execution method of the program is a first execution method, not to transmit a request for obtaining an execution status of the program to the control apparatus, and in a case where the execution method of the program is a second execution method different from the first execution method, to transmit a request for obtaining an execution status of the program to the control apparatus and displaying an execution status of the program received from the control apparatus.

In order to solve the aforementioned problems, the present invention provides a method of controlling a control apparatus which is capable of communicating an information processing apparatus, the method comprising: receiving a program and an execution method of the program from the information processing apparatus; and executing the program based on the execution method, wherein in the executing, upon receiving a request for obtaining an execution status of the program from the information processing apparatus, the execution status of the program is transmitted to the information processing apparatus.

In order to solve the aforementioned problems, the present invention provides a non-transitory computer-readable storage medium storing a program for causing a computer to function as an information processing apparatus which generates a program to be executed by a control apparatus, the information processing apparatus comprising: a transmission unit that transmits the program and an execution method of the program to the control apparatus; and a control unit that in a case where the execution method of the program is a first execution method, does not transmit a request for obtaining an execution status of the program to the control apparatus, and in a case where the execution method of the program is a second execution method different from the first execution method, transmits a request for obtaining an execution status of the program to the control apparatus and displays an execution status of the program received from the control apparatus.

In order to solve the aforementioned problems, the present invention provides a non-transitory computer-readable storage medium storing a program for causing a computer to function as a control apparatus which is capable of communicating with an information processing apparatus, the control apparatus comprising: a reception unit that receives a program and an execution method of the program from the information processing apparatus; and a control unit that executes the program based on the execution method, wherein upon receiving a request for obtaining an execution status of the program from the information processing apparatus, the control unit transmits the execution status of the program to the information processing apparatus.

According to the present invention, it is possible to support program generation of a user by visualizing a status of program execution in a control target in program development.

Further features of the present invention will become apparent from the following description of exemplary embodiments (with reference to the attached drawings).

BRIEF DESCRIPTION OF THE DRAWINGS

FIG. 1B is a block diagram illustrating a configuration of a control target according to the present embodiment.

FIG. 2E is a diagram illustrating a UI screen provided by the programming tool according to the first embodiment.

FIG. 8 is a flowchart exemplifying processing for executing a program using the second execution method in step S508 of FIG. 5 according to a second embodiment.

FIG. 9 is a diagram illustrating a UI screen provided by the programming tool according to the second embodiment.

FIGS. 10A and 10B are diagrams illustrating UI screens provided by the programming tool according to a third embodiment.

DESCRIPTION OF THE EMBODIMENTS

Figure 1A:
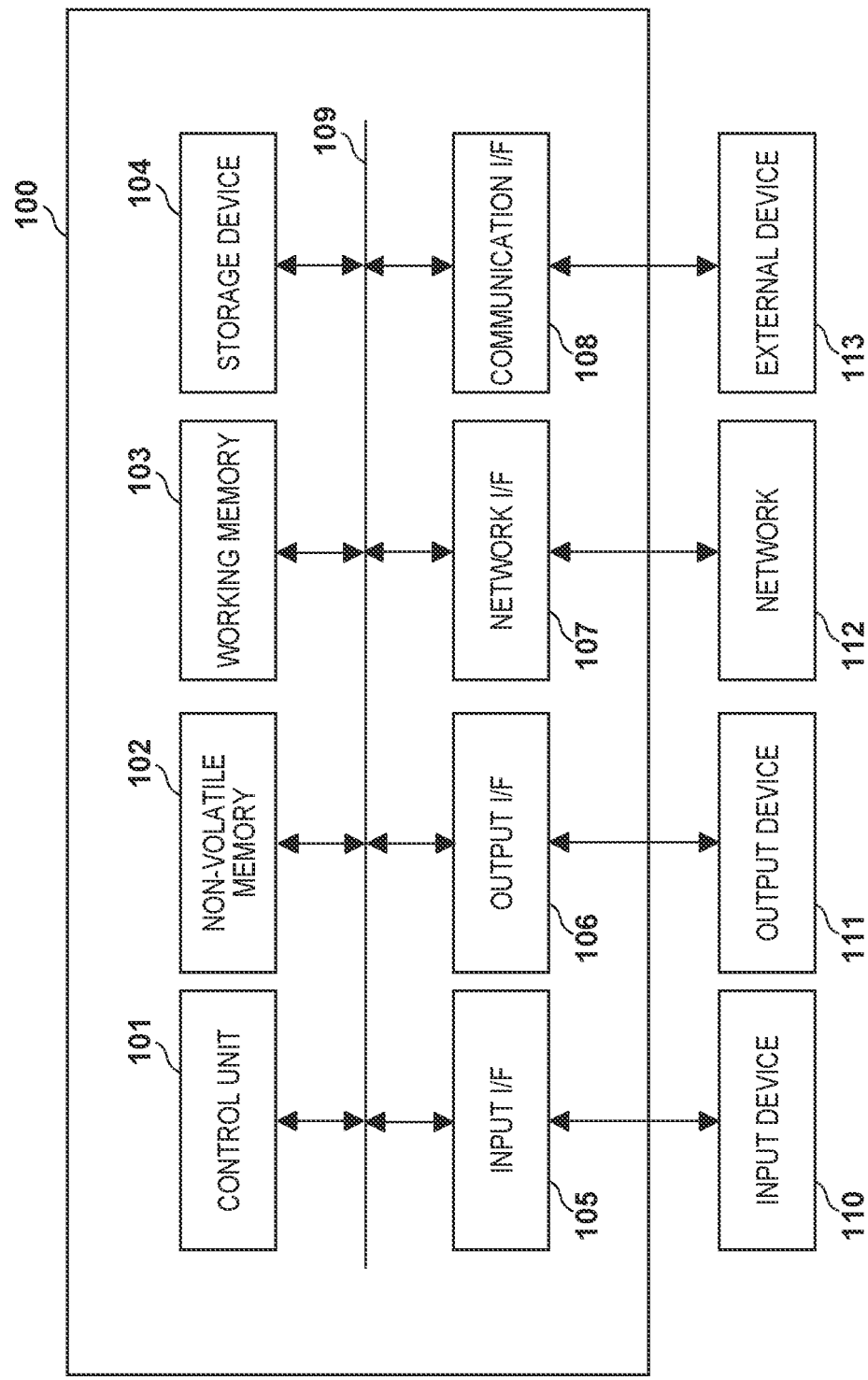
FIG. 1A is a block diagram illustrating a configuration of a development support apparatus according to the present embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

A system of the present embodiment includes a control target that operates according to a control program and a development support apparatus that supports development of the control program.

The development support apparatus of the present embodiment is, for example, an information processing apparatus, such as a personal computer (PC) but may be a smartphone or a tablet device.

The development support apparatus of the present embodiment provides a visual programming tool (hereinafter, the programming tool) that can generate the control program by combining blocks. The programming tool of the present embodiment is executed as an application that operates on a PC that serves as the development support apparatus. A block is a visual object that represents a unit of processing of a program. There are various types of blocks, and a program can be generated by combining them. A program generated using the programming tool is configured by at least one block.

The processing of the development support apparatus of the present embodiment may be realized by a single PC or may be realized by distributing functions to a plurality of PCs as necessary. The plurality of PCs are connected to each other so as to be capable of communication.

The control target of the present embodiment is a control apparatus, such as an automatic shooting camera provided with a PTZ function. The PTZ function is a function that can control swiveling of the control target in respective directions, which are panning, tilting, and zooming. PTZ is an acronym for pan (panorama), tilt, and zoom. Panning involves swiveling in a horizontal direction. Tilting involves swiveling in a vertical direction. Zooming involves zooming in (telephoto) and zooming out (wide angle).

<Configuration of Development Support Apparatus>

First, a configuration of the development support apparatus of the present embodiment will be described with reference to FIG. 1A.

FIG. 1A is a block diagram illustrating a configuration of a development support apparatus 100 according to the present embodiment.

The development support apparatus 100 includes a control unit 101, a non-volatile memory 102, a working memory 103, a storage device 104, an input interface 105, an output interface 106, a network interface 107, a communication interface 108, and a system bus 109.

The control unit 101 includes a computational processor, such as a CPU or an MPU that comprehensively controls the entire development support apparatus 100. The non-volatile memory 102 is a ROM for storing programs to be executed by the processor of the control unit 101 and parameters. Here, the program is a program for executing processing of the first and second embodiments, which will be described later. The working memory 103 is a RAM for temporarily storing programs and data supplied from an external device or the like. The storage device 104 is an internal device, such as a hard disk or a memory card embedded in the development support apparatus 100, or an external device, such as a hard disk or a memory card connected to the development support apparatus 100 so as to be removable. The storage device 104 includes a memory card, a hard disk, or the like that is comprised of a semiconductor memory, a magnetic disk, or the like. The storage device 104 also includes a storage medium that is comprised of a disk drive for reading and writing data to and from an optical disk, such as a DVD or a Blu-ray® Disc.

The input interface 105 receives user operations for an input device 110, such as a mouse, a keyboard, and a touch panel, and outputs operation instructions to the control unit 101. The output interface 106 displays data held by the development support apparatus 100 or data supplied from an external device on an output device 111, such as a display or a monitor comprised of an LCD or an organic EL. The network interface 107 connects to a network 112, such as the Internet or a local area network (LAN). The communication interface 108 is connected to an external device 113, such as a control target 150, via a communication line, such as 4G or 5G, so as to be capable of communication. The system bus 109 is connected to respective components 101 to 107 of the development support apparatus 100 so as to be capable of data exchange.

The processing of the development support apparatus 100 according to the present embodiment is realized by reading software provided by an application. It is assumed that the application includes software for utilizing the basic functions of an OS installed in the development support apparatus 100. The OS of the development support apparatus 100 may include software for realizing processing in the present embodiment.

<Configuration of Control Target>

Next, a configuration of the control target of the present embodiment will be described with reference to FIG. 1B.

FIG. 1B is a block diagram illustrating a configuration of the control target 150 according to the present embodiment.

The control target 150 includes a lens barrel 151 and a control box 154.

The lens barrel 151 includes a lens unit 155 and an image capturing unit 156 and is driven by a tilt driving unit 152 so as to rotate in a tilt direction and by a pan driving unit 153 so as to rotate in a pan direction.

The lens unit 155 includes a zoom lens and a focus lens, and driving control of a zoom position and a focus position are performed by a lens driving unit 157.

The image capturing unit 156 includes an image sensor, such as a CMOS that converts light of a subject image formed by the lens unit 155 into an electric signal, and converts a captured analog image signal into a digital signal and outputs it as image data to an image processing unit 159 and a communication unit 164.

The tilt driving unit 152 includes a driving mechanism, such as a motor, and a driver for driving the lens barrel 151 so as to rotate in the pitch direction. The pan driving unit 153 includes a driving mechanism, such as a motor, and a driver for driving the lens barrel 151 so as to rotate in a yaw direction. The tilt driving unit 152 and the pan driving unit 153 drive the lens barrel 151 so as to rotate in the tilt direction and the pan direction in response to a driving signal from a lens barrel driving unit 158.

The control box 154 includes the lens driving unit 157, the lens barrel driving unit 158, the image processing unit 159, a subject information recording unit 160, a storage unit 161, a control unit 162, a subject detection unit 163, and the communication unit 164.

The lens driving unit 157 includes a driving mechanism, such as a motor, and a driver for driving the zoom lens and the focus lens included in the lens unit 155. The lens driving unit 157 drives the lens unit 155 to the zoom position and the focus position according to a control command (target position and driving speed) from the control unit 162.

The lens barrel driving unit 158 drives the lens barrel 151 in the tilt direction and the pan direction by outputting a driving signal to the tilt driving unit 152 and the pan driving unit 153 in response to a control command from the control unit 162.

The control command from the control unit 162 to the lens driving unit 157 and the lens barrel driving unit 158 is not limited to the target position and the driving speed and may be acceleration, time-division data up to the target position, and the like.

The image processing unit 159 executes image processing, such as distortion correction, white balance adjustment, and color interpolation processing, on image data captured by the image capturing unit 156 and outputs the image-processed image data to the subject detection unit 163. The image processing unit 159 converts the image-processed image data into a recording format, such as JPEG or MPEG, and outputs it to the storage unit 161.

The storage unit 161 includes a ROM, which is a non-volatile memory for storing programs to be executed by the processor of the control unit 162 and parameters, and a RAM, which is a volatile memory for temporarily storing programs and data supplied from the development support apparatus 100. Further, the storage unit 161 stores image data (captured image) captured by the image capturing unit 156, information indicating whether a subject has been detected from a captured image, information of a subject detected from a captured image, information indicating whether an image to be captured has been shot, and the like as information of a shooting status in the control target 150 to be transmitted to the development support apparatus 100.

The control unit 162 includes a computational processor, such as a CPU or an MPU that comprehensively controls the entire control target 150. The control unit 162 performs automatic shooting by controlling each component of the control target 150 by executing a program stored in the storage unit 161. In order to perform automatic shooting independent of user operation, the control unit 162 executes a search sequence for detecting a subject to be shot (target subject), a tracking sequence for tracking the subject detected by the search sequence, a shooting sequence which includes zoom control, focus control, and exposure control for the subject, and the like.

The search sequence detects a subject in the angle of view while changing the pan/tilt position and the zoom position. The tracking sequence determines a target subject based on a result of subject detection by the subject detection unit 163. Then, the tracking sequence determines the zoom position of the lens unit 155 and the target positions in the tilt direction and the pan direction of the lens barrel 151 for obtaining an appropriate composition for shooting such that the target subject falls within the angle of view and controls the lens driving unit 157 and the lens barrel driving unit 158 based on the determined target positions. The shooting sequence starts and ends shooting at appropriate timings and performs control for recording image data.

The subject detection unit 163 includes processing for determining the orientation of a subject such as the face of a person, processing for detecting the position of a subject, processing for detecting the size of a subject, processing for registering a subject, and processing for uniquely identifying a registered subject. The subject detection unit 163 extracts subject information (such as face size, face position, face direction, face identification result) from a subject region of image data outputted from the image processing unit 159 and outputs it to the control unit 162 and the subject information recording unit 160.

The subject information recording unit 160 records subject information based on a subject detection result inputted from the subject detection unit 163.

The communication unit 164 is connected to an external device, such as the development support apparatus 100, via a communication line, such as 4G or 5G, so as to be capable of communication. The communication unit 164 transmits the shooting status information stored in the storage unit 161, the subject information recorded in the subject information recording unit 160, the control command (pan/tilt position and zoom position), outputted from the control unit 162, and the image data captured by the image capturing unit 156 to an external device.

<Description of Programming Tool>

Next, the programming tool that operates in the development support apparatus 100 of the present embodiment will be described with reference to FIGS. 2A to 2E.

Figure 2A:
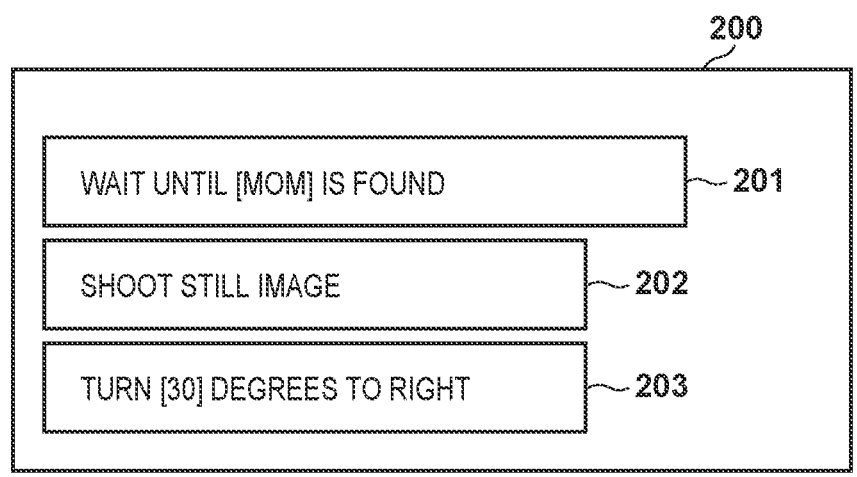
FIG. 2A is a diagram illustrating a configuration of a program that includes programmed blocks of the present embodiment.

FIG. 2A is a diagram illustrating a configuration of a program that includes programmed blocks. FIGS. 2B to 2E are diagrams illustrating UI screens provided by the programming tool according to the present embodiment.

First, a method of generating a program 200 using the development support apparatus 100 of the present embodiment will be described.

Figure 2B:
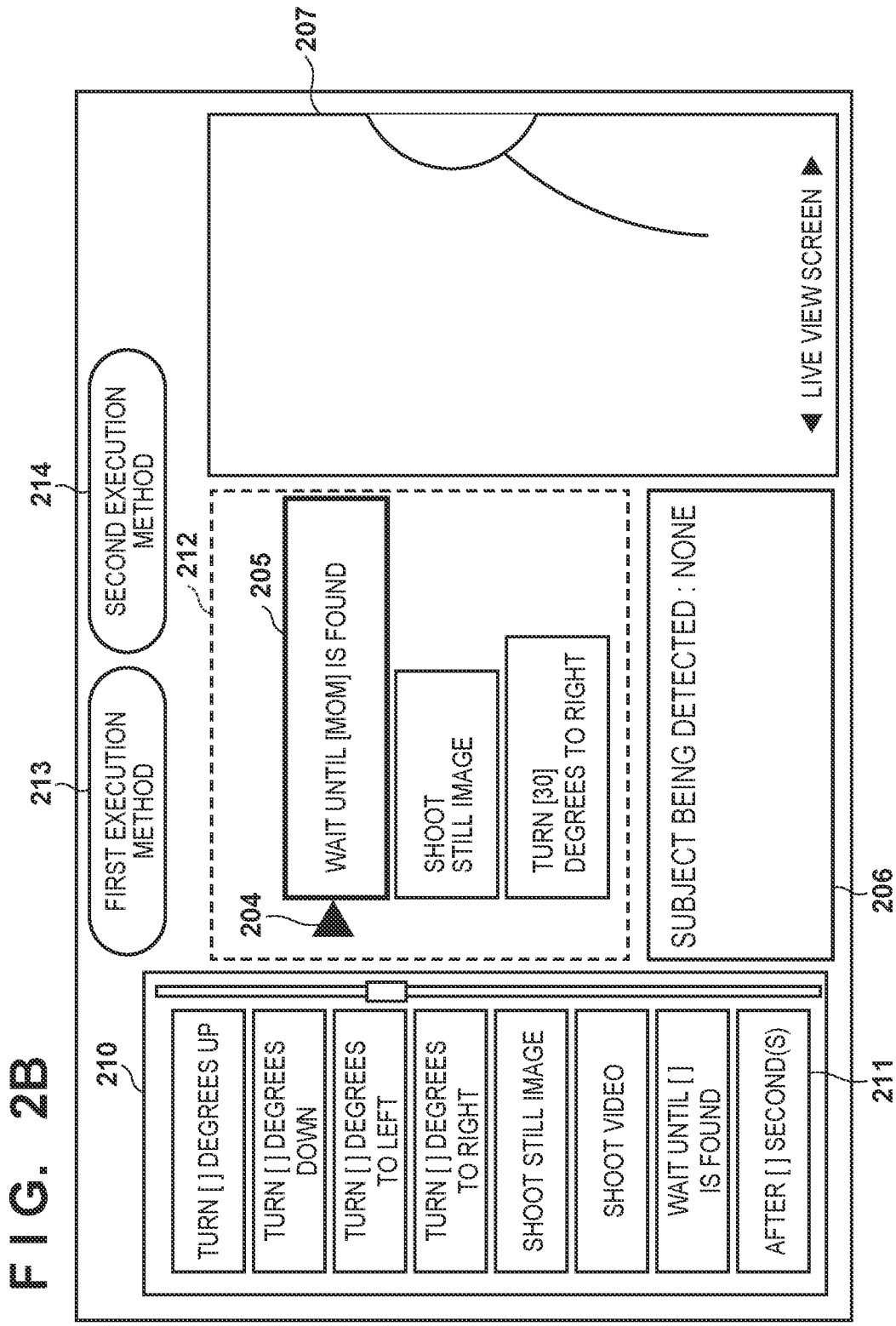
FIG. 2B is a diagram illustrating a UI screen provided by a programming tool according to a first embodiment.
Figure 2C:
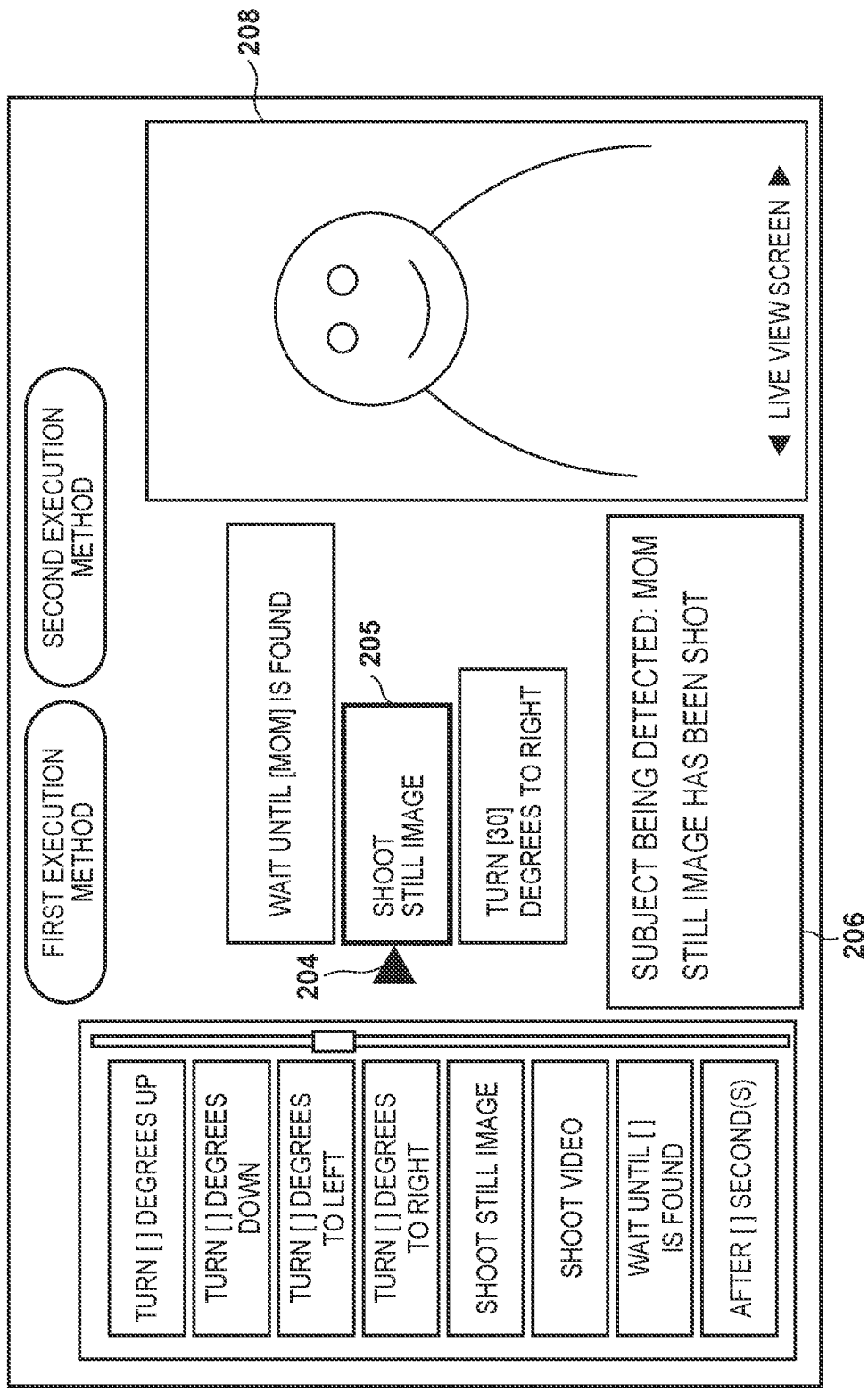
FIG. 2C is a diagram illustrating a UI screen provided by the programming tool according to the first embodiment.
Figure 2D:
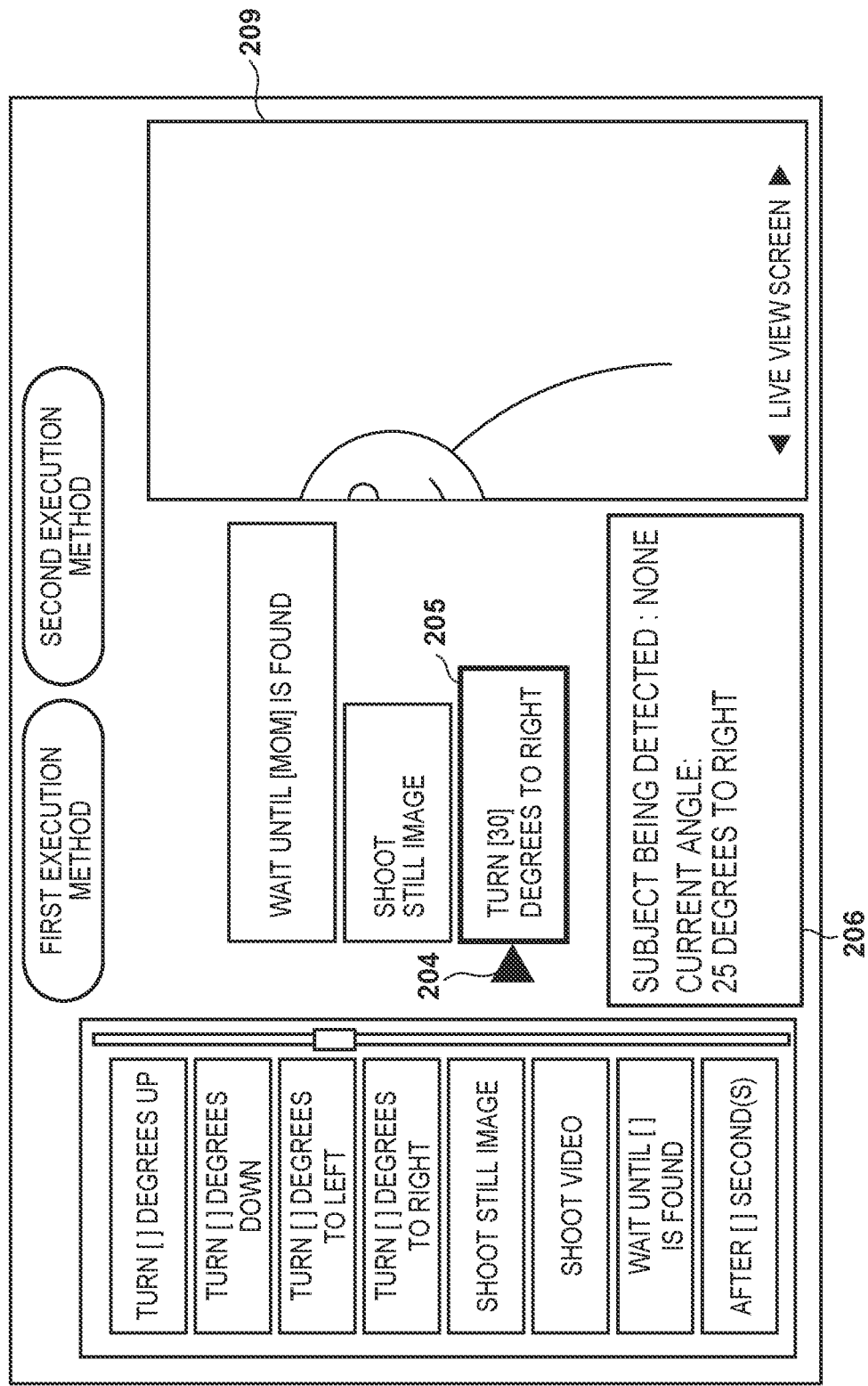
FIG. 2D is a diagram illustrating a UI screen provided by the programming tool according to the first embodiment.

The program 200 is generated by combining respective blocks in an operation area 212 by dragging and dropping any of a plurality of blocks displayed a block list 210 illustrated in FIG. 2B into the operation area 212. In the example of FIG. 2A, the program 200 includes blocks 201 to 203 selected from the block list 210.

Depending on some types of blocks, a parameter of the block can be arbitrarily set by the user and can be inputted by clicking on an inside 211 of the frame of the block. The parameters that can be inputted are, for example, the name of a subject registered in the control target 150 and the pan/tilt position of the control target 150. The name of a subject is set by the development support apparatus 100 obtaining and displaying the image data associated with the subject information registered in the control target 150 from the control target 150 and the user inputting a name on a name registration screen 215 in FIG. 2E. In addition, the name of the set subject is associated with "faceid" of a scenario, which will be described later in FIG. 3, and is transmitted to the control target 150.

The name of the subject is inputted by making a selection from options in a list of names for each subject. Regarding the pan/tilt position, any angle from 0 to 360 degrees is inputted with the input device 110.

Although the name of the subject and the pan/tilt position are given as examples of parameters of blocks that can be inputted, the parameters that can be inputted are not limited to these and may be, for example, the date and time, the number of seconds, or the like for specifying the execution timing of the block.

Next, displaying of the program execution status by the programming tool of the present embodiment will be described.

First, as illustrated in FIG. 2B, a block being executed is displayed in an emphasized manner by an arrow 204 being aligned with the block being executed and a thick frame 205 surrounding the block being executed. With this, the block currently being executed is clearly indicated. In addition, the name of a subject in the image being captured by the control target 150, the image shooting status, the pan/tilt position, and the like are displayed in an information display area 206.

The name of a subject is obtained from the control target 150 when a subject in the image coincides with the registered subject information and displayed. The shooting status of the image is obtained from the control target 150 and displayed. The pan/tilt position is obtained from the control target 150 and displayed. Furthermore, image data (live view images) 207 to 209 (FIGS. 2B to 2D) being captured by the control target 150 is obtained in real time from the control target 150 and displayed.

By the status of program execution by the control target 150 being thus displayed in the development support apparatus 100, the user can visually recognize the program execution status and confirm whether a program that does what is expected has been generated.

The system of the present embodiment can execute a program by either the first execution method or the second execution method, which will be described below.

In the first execution method, a program is instantaneously executed when the power of the control target 150 is turned on. The first execution method can be designated by the user operating a button 213 of the programming tool.

In the second execution method, the control target 150 executes a program by the user giving an instruction in the programming tool and the execution status can be visually confirmed in the development support apparatus 100 as described above. The second execution method can be designated by the user operating a button 214 of the programming tool.

<Description of Scenario>

Figure 3:
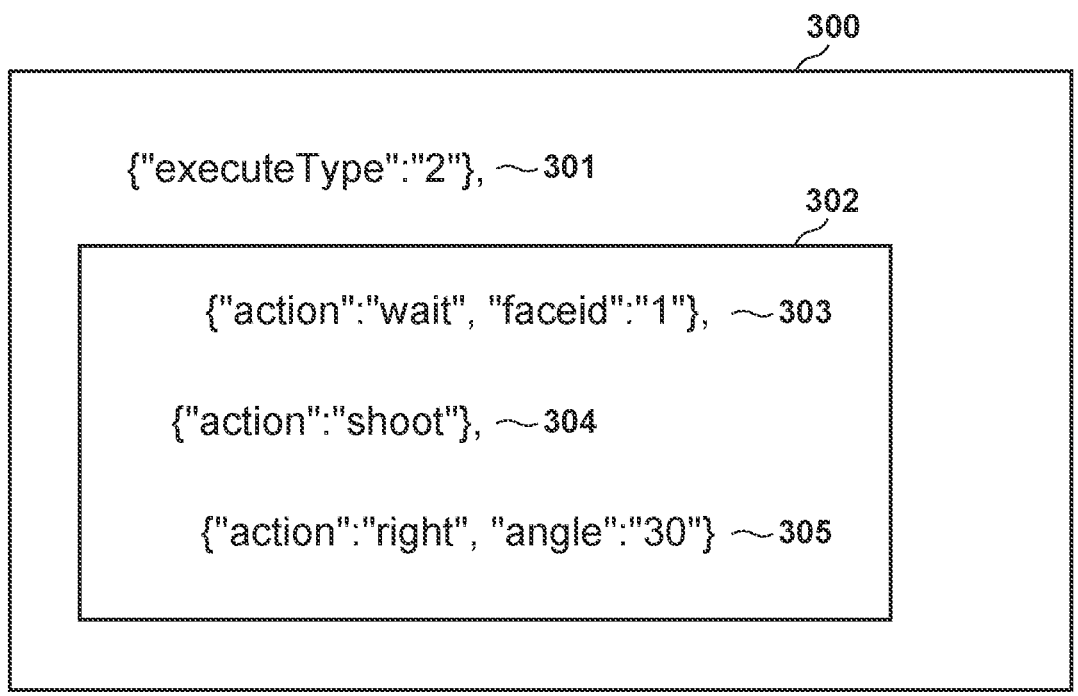
FIG. 3 is a diagram illustrating a scenario that includes a program and an execution method according to the first embodiment.

Next, a scenario 300 of the present embodiment will be described with reference to FIG. 3.

The scenario 300 includes a program 302 and an execution method 301 of the program 302. The program 302 is generated in the development support apparatus 100 in a format similar to that of the program 200 in FIG. 2A. The program 302 is converted from the program 200, which is in a block format, into the program 302, which is in a JavaScript Object Notation (JSON) format, in the development support apparatus 100. When converting the program 200, which is in a block format, into the program 302, which is in a text format, one block is converted into one line of text. The blocks 201, 202, and 203 of FIG. 2A correspond to programs 303, 304, and 305 of FIG. 3, respectively.

The program 303 for which the block 201, "wait until [Mom] is found", has been converted into a JSON format indicates that the block is for waiting for a subject whose "faceid" is registered as "1" in the control target 150. "faceid" is subject information registered by the control target 150 and is stored in the control target 150 and the development support apparatus 100 in association with the name of a subject inputted by the user in the development support apparatus 100.

The program 304 for which the block 202, "shoot a still image", has been converted into a JSON format indicates that the block is for shooting a still image. The program 305 for which the block 203, "turn degrees to the right", has been converted into a JSON format indicates that the block is for panning to a position that is "30" degrees to the right from the current pan/tilt position.

In addition, the execution method is designated by the user operating the programming tool. When an execution method is designated, the designated execution method is converted into JSON data, such as the program 301. When the first execution method is designated, the method is converted to "'executeType": "1"', and when the second execution method is designated, the method is converted to "'executeType": "2"'.

The scenario 300, which is configured by the programs 302 and 303 and the execution method 301, which have been converted into a JSON format, is transmitted from the development support apparatus 100 to the control target 150.

Regarding the list of blocks in FIG. 2A, there are different variations—for example, blocks, such as "turn degrees to the left/up/down" and "shoot a video", and blocks for which a condition has been defined, such as "after [5] second(s)" and "upon the power button of the control target being pressed"—aside from "wait until [Mom] is found" (201), "shoot a still image" (202), and "turn degrees to the right" (203), which configure the program 200. Portions, such as

[Mom] and [30], surrounded by [ ] in each block indicate that the value can be arbitrarily inputted by the user. In other words, it is possible to arbitrarily set a name of a person other than [Mom] and a parameter other than [30].

Figure 4A:
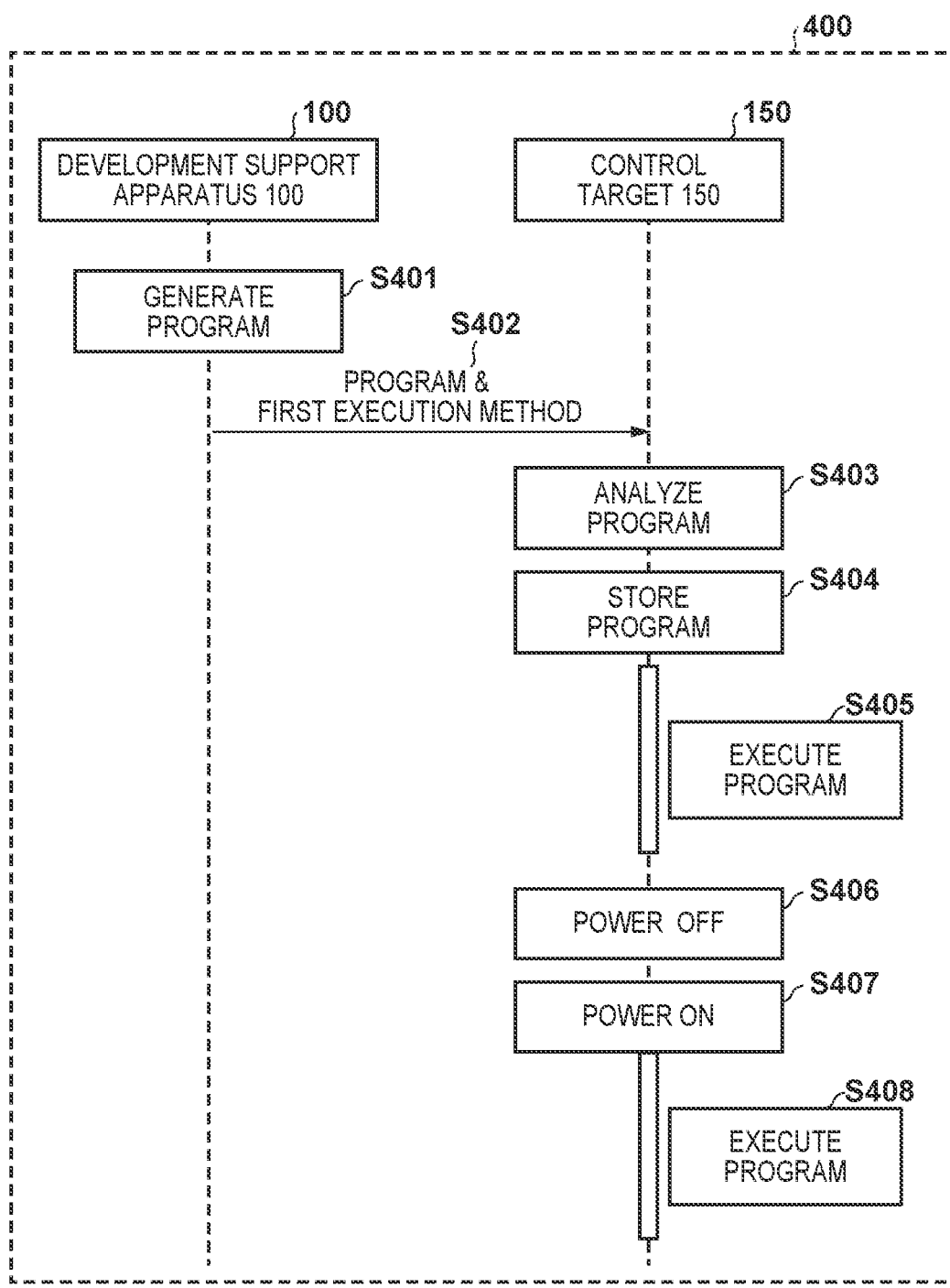
FIG. 4A is a sequence diagram illustrating processing for a first execution method according to the first embodiment.

Next, processing sequences according to the first execution method and the second execution method in the system of the present embodiment will be described with reference to FIGS. 4A and 4B.

First, a processing sequence 400 of the first execution method will be described with reference to FIG. 4A.

In steps S401 and S402, the development support apparatus 100 generates a program for which the first execution method is designated and transmits the program to the control target 150. As described above, the user can designate the first execution method by operating the button 213 of the programming tool illustrated in FIG. 2.

In steps S403 and S404, the control target 150 analyzes the program received from the development support apparatus 100 and stores the analysis result.

In step S405, the control target 150 instantaneously executes the program. Further, in steps S406 to S408, even if the power of the control target 150 is turned off, when the power of the control target 150 is turned on again, the program can instantaneously be read out from the storage unit 161 and executed.

Next, a processing sequence 410 of the second execution method will be described with reference to FIG. 4B.

In steps S411 and S412, the development support apparatus 100 generates a program for which the second execution method is designated and transmits the program to the control target 150. As described above, the user can designate the second execution method by operating the button 214 of the programming tool illustrated in FIG. 2.

In steps S413 and S414, the control target 150 analyzes the program received from the development support apparatus 100 and temporarily stores the analysis result. That is, when the power of the control target 150 is turned off in step S419, the program is erased, and even when the power of the control target 150 is turned on in step S420, the program is not executed.

In step S415, the control target 150 executes the program using the second execution method, and at the same time, the development support apparatus 100 makes a request for obtaining the program execution status to the control target 150 in step S416 and the control target 150 transmits the program execution status to the development support apparatus 100 in step S417. In step S418, the development support apparatus 100 displays the program execution status. The program execution status displayed in the development support apparatus 100 is as illustrated in FIGS. 2B to 2E.

Next, processing of the control target 150 of the present embodiment will be described with reference to FIG. 5.

Figure 5:
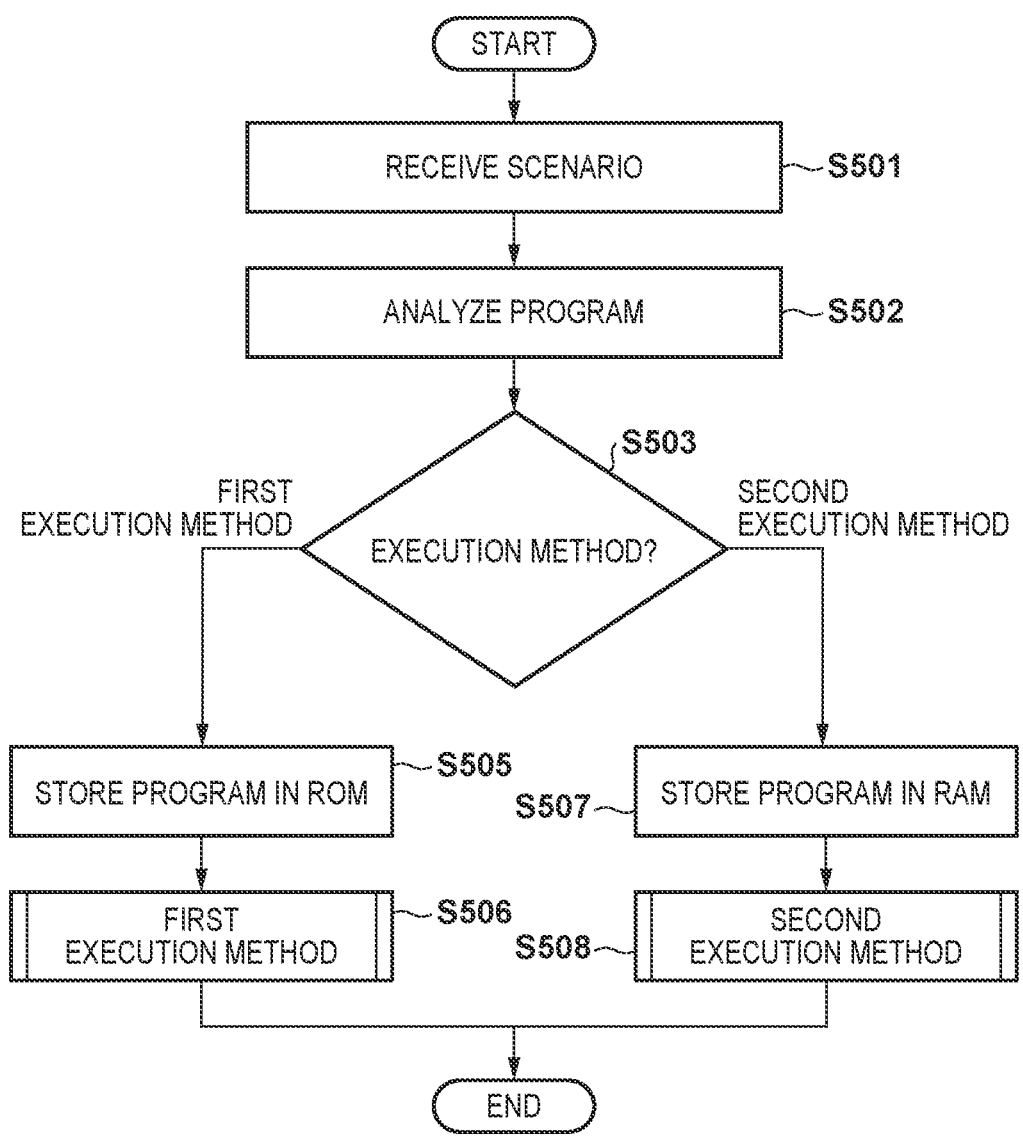
FIG. 5 is a flowchart exemplifying processing of a control target according to the first embodiment.

The processing of FIG. 5 is realized by the control unit 162 of the control target 150 controlling each component by executing a program stored in the storage unit 161. In the following, it is assumed that the development support apparatus 100 and the control target 150 are connected so as to be capable of communication.

In step S501, the control unit 162 receives a scenario from the development support apparatus 100 using the communication unit 164.

In step S502, the control unit 162 analyzes the program received in step S501 and obtains the execution method, the number of blocks, and the configuration number, the command value, and the condition value of each block. The configuration number is a number that indicates what number the block is for each block. Details of the command value and the condition value will be described later.

In step S503, the control unit 162 determines the execution method based on the analysis result of step S502. The execution method is the first execution method or the second execution method and is transmitted with the program. Regarding the method for determining the execution method, if the value of the "executeType" of the execution method 301 is "1", it is determined that the method is the first execution method and if the value is "2", it is determined that the method is the second execution method. The scenario 300 of FIG. 3 indicates that the program 302 is to be executed using the second execution method. The control unit 162 stores the program received in step S501 and the analysis result of step S502 in the storage unit 161. In this case, these are stored in a different region (ROM or RAM) of the storage unit 161 depending on the execution method.

When the control unit 162 determines that the execution method is the first execution method, the control unit 162 advances the processing to step S505, and when the control unit 162 determines that the execution method is the second execution method, the control unit 162 advances the processing to step S507.

In step S505, the control unit 162 stores the program in the non-volatile memory (ROM).

In step S506, the control unit 162 executes the program using the first execution method.

In step S507, the control unit 162 temporarily stores the program in the volatile memory (RAM).

In step S508, the control unit 162 executes the program using the second execution method.

Next, processing for executing the program using the second execution method in step S508 of FIG. 5 will be described with reference to FIG. 6.

Figure 6:
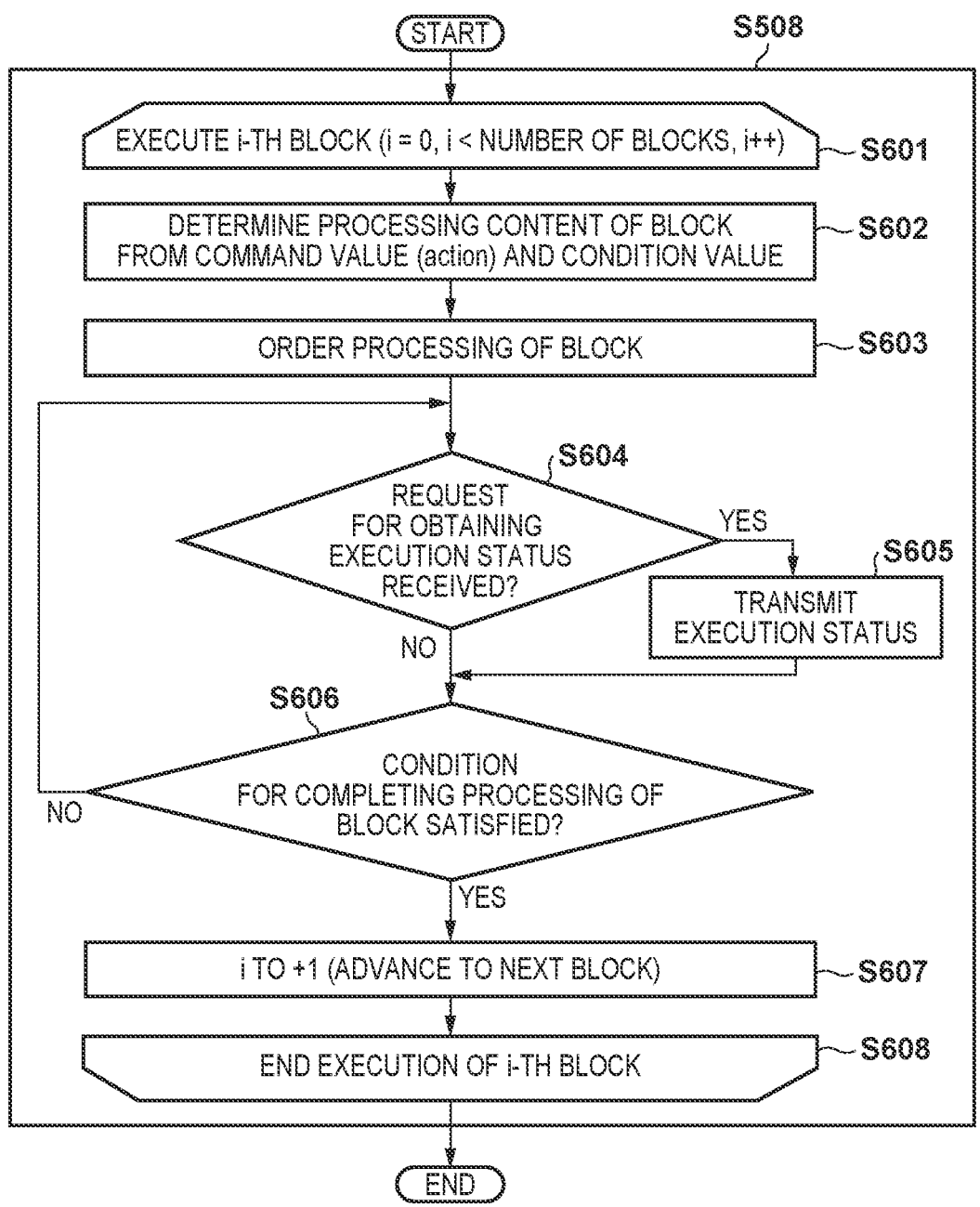
FIG. 6 is a flowchart exemplifying processing for executing a program using the second execution method in step S508 of FIG. 5.

The processing of FIG. 6 is executed by designating the second execution method in the program that the development support apparatus 100 transmits to the control target 150.

In the following, an example of processing for executing the program 302 of FIG. 3 using the second execution method in step S508 of FIG. 5 will be described.

In step S601, the control unit 162 executes the zeroth block based on the block configuration numbers obtained by analyzing the program in step S502 of FIG. 5. In a case of the program 302 of the present embodiment, the configuration numbers obtained in step S502 are zeroth for the block 303, first for the block 304, and second for the block 305. That is, the program 303, which is the zeroth block, is executed.

In step S602, the control unit 162 determines the processing content of the block based on the command value and the condition value of the block obtained in step S502. Each block always has at least one command value, and in the example of the program 302 of FIG. 3, a command value corresponds to a value of "action", which represents the processing content of the block. A condition value is a value that can be arbitrarily set by the user and may or may not be held depending on the processing content of the block and, in the example of the program 302 of FIG. 3, corresponds to values of "faceid" and "angle". In a case of the block 303 whose block configuration number of FIG. 3 is zeroth, the command value is "wait" and the condition value is "1"; therefore, it is determined that the processing content of the block is "wait until [Mom] is found".

In step S603, the control unit 162 orders processing of the block for "wait until [Mom] is found". That is, the control target 150 of the present embodiment outputs a command to wait until a person registered as "'faceid': '1'", that is, Mom, is detected.

In step S604, the control unit 162 determines whether a request for obtaining the program execution status has been received from the development support apparatus 100. When the control unit 162 determines that a request for obtaining the program execution status has been received from the development support apparatus 100, the control unit 162 advances the processing to step S605. When the control unit 162 determines that a request for obtaining the program execution status has not been received from the development support apparatus 100, the control unit 162 advances the processing to step S606.

In step S605, the control unit 162 transmits the program execution status to the development support apparatus 100 using the communication unit 164. The control unit 162 transmits the shooting status information that includes "configuration number of block being executed: 0, subject being detected: none, captured image: 207" to the development support apparatus 100. Based on this shooting status information, the development support apparatus 100 displays the UI screen of FIG. 2B.

In step S606, the control unit 162 determines whether the condition for completing the processing of the block, that is, the condition of "finding Mom", has been satisfied and repeatedly performs the processing of steps S604 and S605 until the control target 150 detects Mom.

When Mom is detected, the control unit 162 advances the processing to step S607 and adds 1 to the block configuration number. Here, since the block configuration number goes from 0 to 1, the execution of the zeroth block ends in step S608, and then, the block advances the first block 304.

The processing returns to step S601, and the control unit 162 executes the first block 304. In step S602, since the value of "action" in the block 304 is "shoot", it is determined that the block is for "shoot a still image". Since there is no parameter that the user can arbitrarily set in this block, the block also does not have a condition value.

In step S603, the control unit 162 orders processing of the block for "shoot a still image".

When it is determined in step S604 that a request for obtaining the execution status has been received from the development support apparatus 100, in step S605, the control unit 162 transmits the shooting status information that includes "configuration number of block being executed: 1, subject being detected: Mom, shooting status: still image shot, captured image: 208" to the development support apparatus 100 using the communication unit 164. Based on this shooting status information, the development support apparatus 100 displays the UI screen of FIG. 2C.

Since the block 304 does not have a condition value, in step S606, the control unit 162 determines whether a still image has been shot. When the control unit 162 determines that a still image has been shot, in step S607, the control unit 162 adds 1 to the block configuration number. That is, since the block configuration number goes from 1 to 2, the execution of the first block ends in step S608, and then, the block advances the second block 305.

The processing returns to step S601, and the control unit 162 executes the second block 305.

In step S602, since the value of "action" of the block 305 is "right" and the condition value is "30", the control unit 162 determines that the block is for "turn degrees to the right".

In step S603, the control unit 162 orders processing of the block for "turn degrees to the right". The control unit 162 outputs a control command to the lens barrel driving unit 158 such that the control target 150 pans 30 degrees to the right from the current pan/tilt position.

When the control unit 162 determines in step S604 that a request for obtaining the program execution status has been received from the development support apparatus 100, in step S605, the control unit 162 transmits the shooting status information that includes "configuration number of block being executed: 2, subject being detected: none, PTZ position: 25 degrees to the right, captured image: 209" to the development support apparatus 100 using the communication unit 164. Based on this shooting status information, the development support apparatus 100 displays the UI screen of FIG. 2D.

In step 606, the control unit 162 determines whether the condition for completing the processing of the block, that is, the condition of "panning to the position 30 degrees to the right", has been satisfied and repeats until the position 30 degrees to the right is reached.

When the control unit 162 determines that the position 30 degrees to the right has been reached, in step S607, the control unit 162 adds 1 to the block configuration number. That is, the block configuration number goes from 2 to 3, and in step S608, execution of the second block is terminated; however, a condition for the loop in step S601 is less than the number of blocks, that is, less than 3. Therefore, the control unit 162 determines that this block is the last block, exits the loop which is from step S601 to step S608, and ends the processing.

When it is determined in step S604 of FIG. 6 that a request for obtaining the execution status has not been received, determination based on the condition for completing the processing of the block is performed in step S606; however, the processing of the block in steps S603 and S606, and the processing of steps S604 and S605 may be executed in parallel.

Figure 4B:
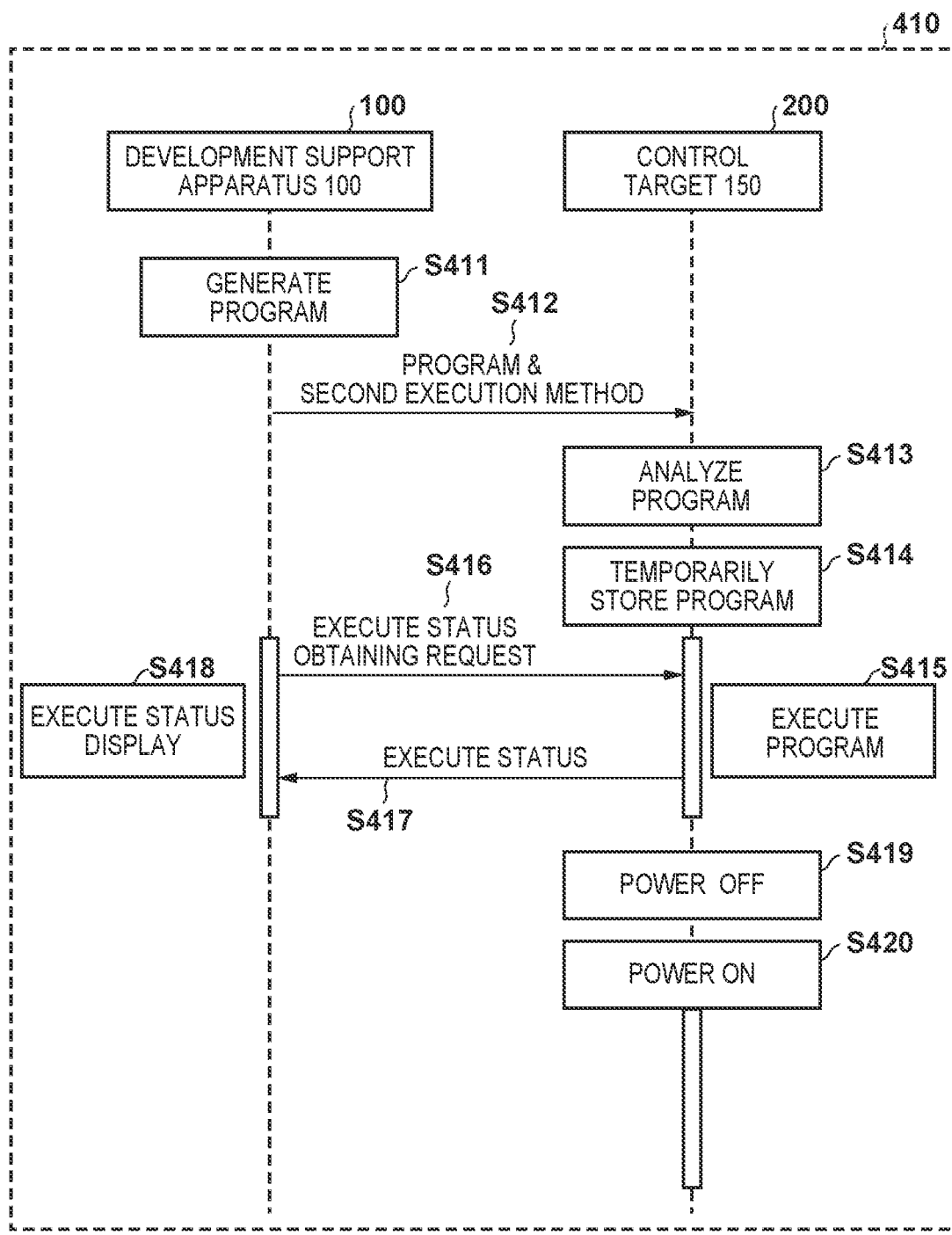
FIG. 4B is a sequence diagram illustrating processing for a second execution method according to the first embodiment.

Further, in the second execution method, as described in step S414 of FIG. 4B, the storage of the program is temporary, and when the power of the control target 150 is turned off, the program is erased.

Next, processing for executing the program using the first execution method in step S506 of FIG. 5 will be described with reference to FIG. 7.

Figure 7:
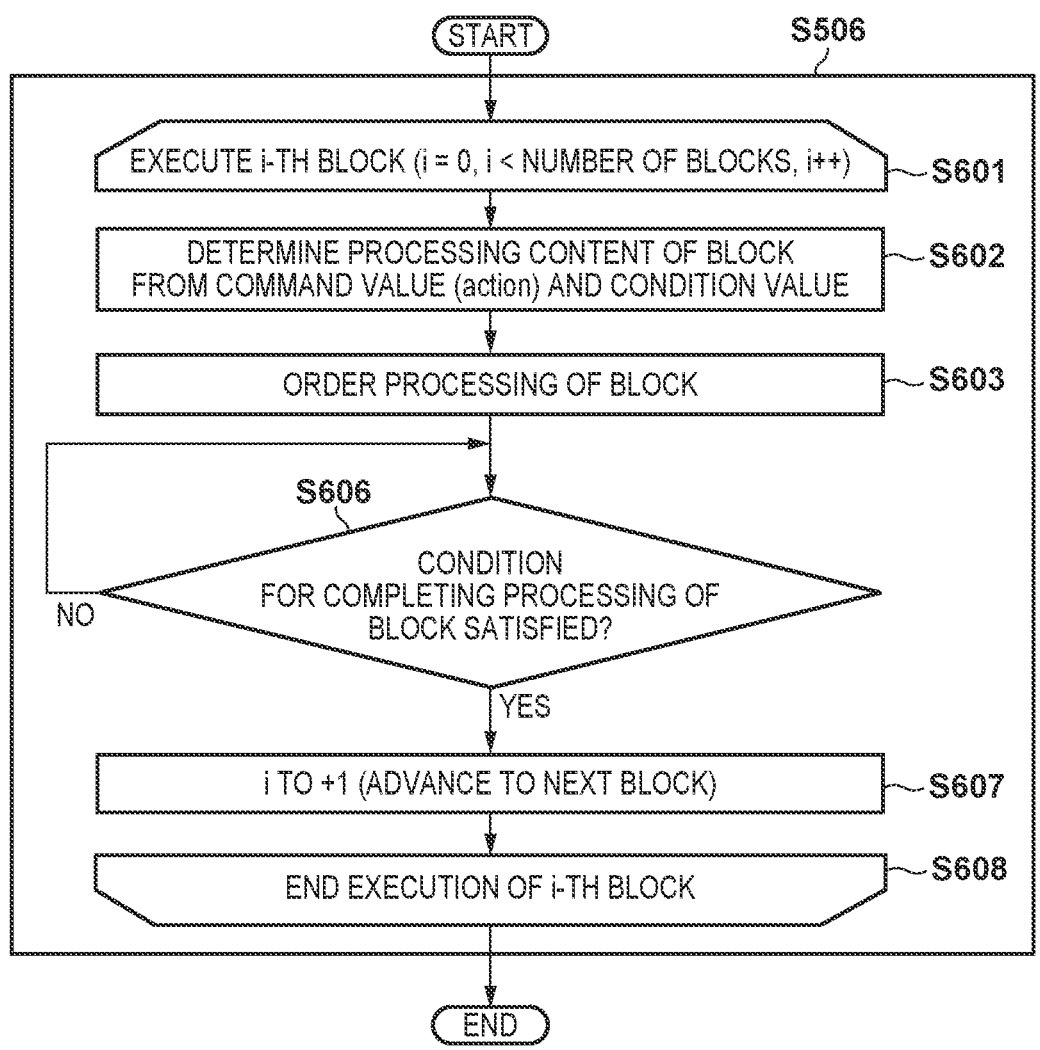
FIG. 7 is a flowchart exemplifying processing for executing a program using the first execution method in step S506 of FIG. 5.

The processing of FIG. 7 is executed by designating the first execution method in the program that the development support apparatus 100 transmits to the control target 150.

In the following, an example of processing for executing the program 302 of FIG. 3 using the first execution method in step S506 of FIG. 5 will be described.

Steps S601 to S603 and steps S606 to S608 which are performed using the first execution method are similar to those of FIG. 6.

In the first execution method, the control unit 162 and the communication unit 164 do not execute the execution status reception determination (step S604) and the execution status transmission (step S605), which are performed in the second execution method. That is, in the first execution method, the development support apparatus 100 does not display the execution status.

Unlike the second execution method, in the first execution method, even if the power of the control target 150 is turned off, by the power of the control target 150 being turned on again, the program is instantaneously read from the storage unit 161 and executed.

As described above, according to the present embodiment, it is possible to support program generation of the user by visualizing the program execution status of the control target 150 in control program development. Specifically, by making it possible to visually confirm the execution status that cannot be recognized simply from an external operation of the control target 150, such as what number the block that the control target 150 is executing is, the subject being detected by the control target 150, the pan/tilt position, and the captured image, it is possible to confirm whether the program in the middle of generation is a program that does what is expected.

In the present embodiment, it has been described that the program is stored in a different region (the ROM or the RAM) according to the designated execution method; however, the program may be stored in the same region. In such a case, it is assumed that the execution method is also stored with the program.

Further, in the present embodiment, the processing in which the analysis result is stored after analyzing the program has been described; however, the procedure may be such that the program is first stored and later analyzed.

In addition, if the execution status obtaining request is received from the development support apparatus 100 while the program is being executed using the first execution method, the control target 150 does not need to transmit any information or may transmit error information.

Further, in the case of the first execution method, an example in which the program is instantaneously executed when the power of the control target 150 is turned on has been described; however, the program may be executed according to another trigger. For example, the program may be executed according to a trigger that a button provided in the control target 150 has been operated.

Second Embodiment

In a second embodiment, an example for which the second execution method of the first embodiment has been improved will be described.

In the program 200 illustrated in FIG. 2A, a block, such as "shoot a still image" (202), is shorter in processing time compared to a block, such as "wait until [Mom] is found" (201), in which condition-based determination according to a condition value is performed. Therefore, the processing of the block advances relatively quickly, making it difficult for the user to visually confirm the execution status of each block being executed in a reliable manner.

Therefore, in the second embodiment, a method of allowing the user to visually confirm the execution status of each block in a reliable manner will be described.

The configuration of the development support apparatus 100 and the control target 150 of the second embodiment is similar to that of the first embodiment.

The control unit 162 determines whether a processing progress request has been received from the development support apparatus 100 and controls the progress of processing of the block according to the determination result.

Since the processing from when the control target 150 receives the program to when the execution method is determined is similar to that in FIG. 5, the processing from when the method is determined to be the second execution method will be described.

The processing for allowing the user to visually confirm the execution status of each block in a reliable manner will be described with reference to FIGS. 8 and 9.

FIG. 8 is a flowchart exemplifying processing for executing a program using the second execution method in step S508 of FIG. 5 according to the second embodiment. FIG. 9 is a diagram illustrating a UI screen provided by the programming tool according to the second embodiment.

The processing from steps S601 to S608 of FIG. 8 is similar to that of FIG. 6.

As illustrated in FIG. 9, the programming tool of the present embodiment includes a button 900 for the user to request advancement of processing of blocks. When the user operates the button 900, the development support apparatus 100 transmits a processing progress request to the control target 150.

In step S801, the control unit 162 determines whether a processing progress request has been received from the development support apparatus 100 and, even when the control unit 162 determines in step S606 that the condition for completing the processing of the block is satisfied in step S606, does not advance the processing of the next block until a processing progress request is received from the development support apparatus 100.

In FIG. 8, the processing progress request reception determination of step S801 is performed after the determination based on the condition for completing the processing of the block in step S606; however, these may be performed in parallel.

As described above, according to the present embodiment, in control program development, the user can visually confirm the status of each instance of program execution in the control target 150 in a reliable manner by operating the button 900 of the development support apparatus 100.

Third Embodiment

In a third embodiment, an example for which the processing of the second embodiment has been further improved will be described.

In the second embodiment, a method in which the processing of blocks is stopped at all the blocks while being advanced one block at a time has been described. In such a case, when a program is configured by a large number of blocks, it takes time to stop at each block, and so, a case where one wishes to stop at a block that is a plurality of blocks ahead is expected.

Therefore, in the third embodiment, a method of stopping at a block that is a plurality of blocks ahead designated by the user will be described.

The configuration of the development support apparatus 100 and the control target 150 of the third embodiment is similar to that of the first embodiment.

The control unit 162 determines whether to stop the processing of blocks according to a stop position designated by the development support apparatus 100 and controls advancement of the processing of blocks according to the determination result.

Since the processing from when the control target 150 receives the program to when the execution method is determined is similar to that in FIG. 5, the processing from when the method is determined to be the second execution method will be described.

Figure 10A:
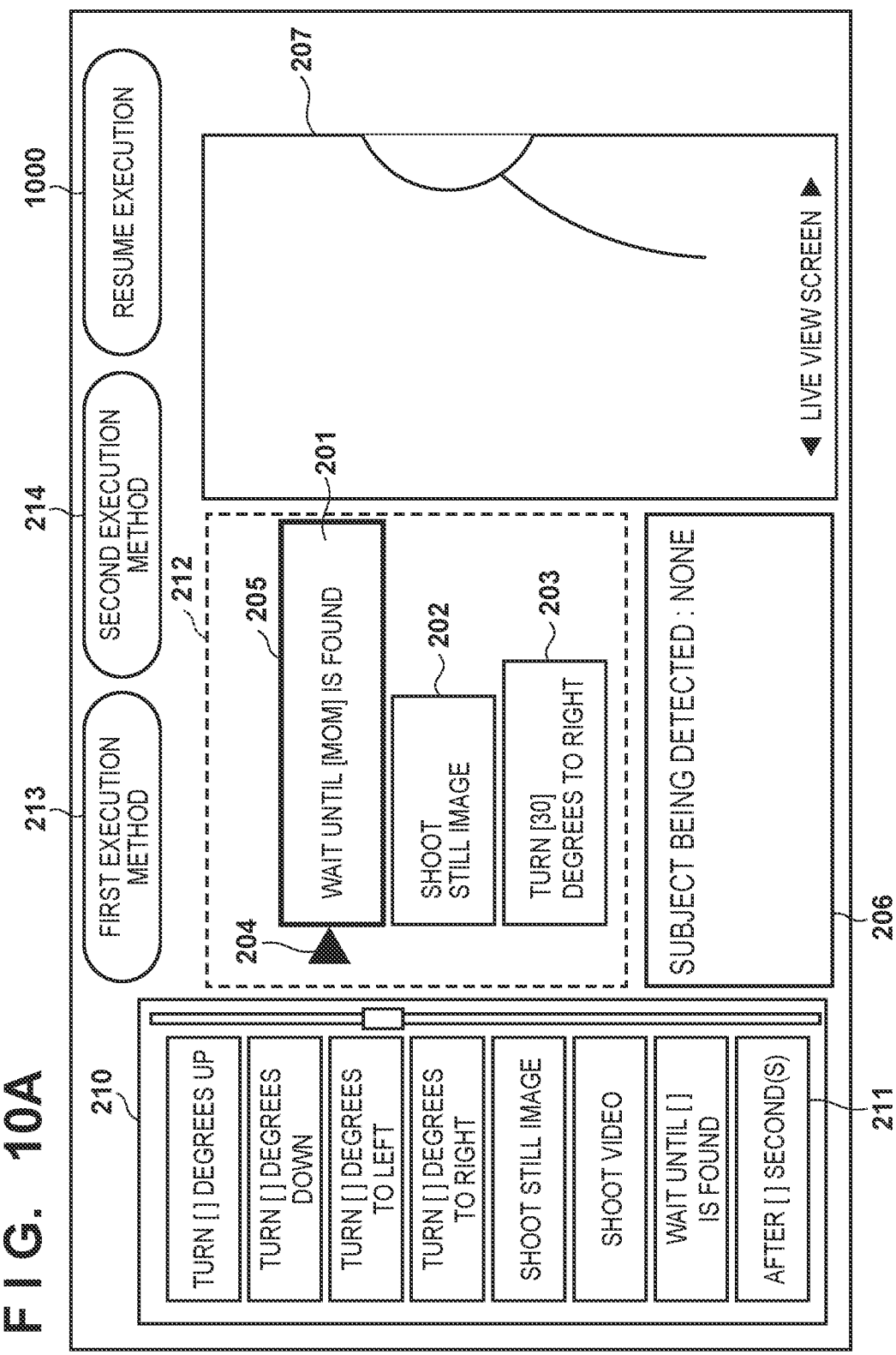
Figure 11:
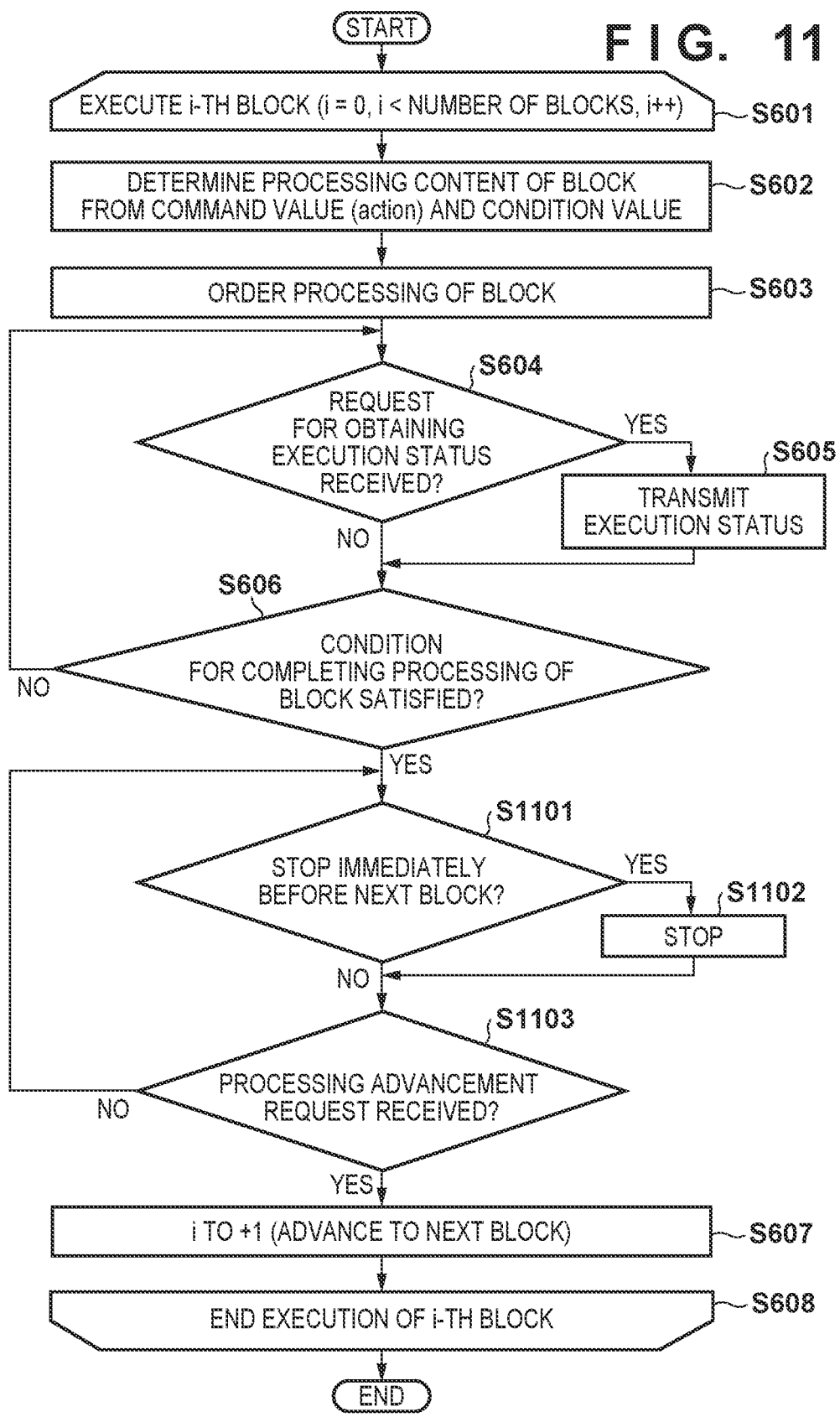
FIG. 11 is a flowchart exemplifying processing for executing a program using the second execution method in step S508 of FIG. 5 according to the third embodiment.

FIGS. 10A and 10B are diagrams illustrating UI screens provided by the programming tool according to the third embodiment. FIG. 11 is a flowchart exemplifying processing for executing a program using the second execution method in step S508 of FIG. 5 according to the third embodiment.

In the development support apparatus 100 of the present embodiment, the user can designate a block at which they wish to stop. More specifically, the user can designate a block at which to stop by clicking on any of the blocks of the program in the operation area 212 of FIG. 10A. In the example of FIG. 10A, it is assumed that while the block 201 is being executed, the user has designated the block 203 as a stop position by clicking on the block 203. In this case, after the control unit 162 performs the block 201 and the block 202, the development support apparatus 100 displays the block 203 in an emphasized manner but does not execute the block 203 and stops in a status of FIG. 10B. Then, upon the user operating a button 1000, the control unit 162 starts execution of the processing of the block 203.

Next, processing of the control target 150 of the present embodiment will be described with reference to FIG. 11.

The processing from steps S601 to S608 of FIG. 11 is similar to that of FIG. 6.

The control unit 162 determines in step S1101 whether to stop immediately before executing the next block based on of the block configuration number of the stop position designated in the development support apparatus 100 and, when the control unit 162 determines that the block at which to stop is the next block, stops immediately before the next block in step S1102.

In step S1103, the control unit 162 continues to stop the block by repeating the processing of steps S1101 and S1102 until a processing advancement request according to the user operating the button 1000 is received.

As described above, according to the present embodiment, in control program development, the user can not only visually confirm the status of each instance of program execution in the control target 150 in a reliable manner but also designate a block that is a plurality of blocks ahead at which the user wishes to stop by operating the button 1000 of the development support apparatus 100.

In the present embodiment, an example in which intermediate blocks up to the block designated as the stop position are executed has been described; however, a configuration may be taken so as not to execute the intermediate blocks and stop at the designated block.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-179089, filed Nov. 8, 2022 which is hereby incorporated by reference herein in its entirety.

What is claimed is:

1. An information processing apparatus which generates a program to be executed by a camera apparatus, the information processing apparatus comprising:
   a transmission unit that transmits the program and an execution method of the program to the camera apparatus; and
   a control unit that
   in a case where the execution method of the program is a first execution method, does not transmit a request for obtaining an execution status of the program to the camera apparatus, and
   in a case where the execution method of the program is a second execution method different from the first execution method, transmits a request for obtaining an execution status of the program to the camera apparatus and displays an execution status of the program received from the camera apparatus,
   wherein the second execution method is an execution method by which an execution status of a program being executed in the camera apparatus can be displayed.

2. The apparatus according to claim 1, further comprising:
   a programming tool by which generation of the program and designation of the execution method of the program are performed in a visual manner,
   wherein the first execution method is an execution method by which the program can be executed in the camera apparatus.

3. The apparatus according to claim 1,
   wherein the program includes at least one unit of processing, and
   wherein the unit of processing includes content for processing to be executed.

4. The apparatus according to claim 3, wherein the unit of processing includes a condition for completing the processing.

5. The apparatus according to claim 3, wherein the control unit displays a program execution status for each unit of processing received from the camera apparatus.

6. The apparatus according to claim 3, wherein in a case where a unit of processing being executed in the camera apparatus has been completed, the control unit transmits a request for executing a next unit of processing to the camera apparatus.

7. The apparatus according to claim 3, wherein the control unit designates a unit of processing for which execution is stopped from among a plurality of units of processing and transmits the unit of processing to the camera apparatus.

8. A camera apparatus which is capable of communicating with an information processing apparatus, the camera apparatus comprising:

a reception unit that receives a program and an execution method of the program from the information processing apparatus;

a storage unit that stores the program; and a control unit that executes the program based on the execution method, wherein upon receiving a request for obtaining an execution status of the program from the information processing apparatus, the control unit transmits the execution status of the program to the information processing apparatus, and wherein the control unit, in a case of a first execution method, stores the program so as not to be erased upon power being turned off, and in a case of a second execution method, temporarily stores the program so as to be erased upon power being turned off.

9. The apparatus according to claim 8, wherein wherein the program includes at least one unit of processing, and wherein the unit of processing includes content for processing to be executed.

10. The apparatus according to claim 9, wherein the unit of processing includes a condition for completing the processing.

11. The apparatus according to claim 10, further comprising:

an analysis unit that analyzes the program, wherein the analysis unit obtains the execution method of the program and the number of units of processing configuring the program, respective configuration numbers of the units of processing, respective processing content of the units of processing, and respective conditions for completing processing of the units of processing, and wherein the control unit determines the execution method of the program based on a result of the analysis by the analysis unit.

12. The apparatus according to claim 10, wherein the control unit executes the unit of processing, determines whether the completion condition of the unit of processing has been satisfied, and in a case where the completion condition has been satisfied, perform control so as to execute a next unit of processing.

13. The apparatus according to claim 12, wherein the control unit, even in a case where the completion condition of the unit of processing has been satisfied, performs control so as not to execute the next unit of processing until a request for executing the next unit of processing is received from the information processing apparatus.

14. The apparatus according to claim 12, wherein the control unit, in a case where the completion condition of the unit of processing has been satisfied, determines whether the next unit of processing is designated as a unit of processing at which to stop, and in a case where the next unit of processing is designated as the unit of processing at which to stop, stops execution of the designated unit of processing.

15. The apparatus according to claim 9, wherein upon receiving the request for obtaining the execution status of the program from the information processing apparatus, the control unit transmits a program execution status for each unit of processing to the information processing apparatus.

16. A method of controlling an information processing apparatus which generates a program to be executed by a camera apparatus, the method comprising:

transmitting the program and an execution method of the program to the camera apparatus; and performing control in a case where the execution method of the program is a first execution method, not to transmit a request for obtaining an execution status of the program to the camera apparatus, and in a case where the execution method of the program is a second execution method different from the first execution method, to transmit a request for obtaining an execution status of the program to the camera apparatus and displaying an execution status of the program received from the camera apparatus, wherein the second execution method is an execution method by which an execution status of a program being executed in the camera apparatus can be displayed.

17. A method of controlling a camera apparatus which is capable of communicating an information processing apparatus, the method comprising:

receiving a program and an execution method of the program from the information processing apparatus;

storing the program; and executing the program based on the execution method, wherein in the executing, upon receiving a request for obtaining an execution status of the program from the information processing apparatus, the execution status of the program is transmitted to the information processing apparatus, and wherein in a case of a first execution method, the program is stored so as not to be erased upon power being turned off, and in a case of a second execution method, the program is temporarily stored so as to be erased upon power being turned off.

18. A non-transitory computer-readable storage medium storing a control program for causing a computer to function as an information processing apparatus which generates a generated program to be executed by a camera apparatus, the information processing apparatus comprising:

a transmission unit that transmits the generated program and an execution method of the generated program to the camera apparatus; and a control unit that in a case where the execution method of the generated program is a first execution method, does not transmit a request for obtaining an execution status of the generated program to the camera apparatus, and in a case where the execution method of the generated program is a second execution method different from the first execution method, transmits a request for obtaining an execution status of the generated program to the camera apparatus and displays an execution status of the generated program received from the camera apparatus, wherein the second execution method is an execution method by which an execution status of a generated program being executed in the camera apparatus can be displayed.

19. A non-transitory computer-readable storage medium storing a control program for causing a computer to function as a camera apparatus which is capable of communicating with an information processing apparatus, the camera apparatus comprising:
- a reception unit that receives a transmitted program and an execution method of the transmitted program from the information processing apparatus;
- a storage unit that stores the transmitted program; and
- a control unit that executes the transmitted program based on the execution method,
- wherein upon receiving a request for obtaining an execution status of the transmitted program from the information processing apparatus, the control unit transmits the execution status of the transmitted program to the information processing apparatus, and
- wherein the control unit,
- in a case of a first execution method, stores the transmitted program so as not to be erased upon power being turned off, and
- in a case of a second execution method, temporarily stores the transmitted program so as to be erased upon power being turned off.

* * * * *